United States Patent
Ganho Da Silva Reis et al.

(10) Patent No.: US 10,819,119 B2
(45) Date of Patent: Oct. 27, 2020

(54) METHOD AND DEVICE FOR WIND POWER CURTAILMENT OPTIMIZATION FOR DAY-AHEAD OPERATIONAL PLANNING OF A POWER NETWORK

(71) Applicant: CENTRO DE INVESTIGAÇÃO EM ENERGIA REN-STATE GRID S.A, Sacavém (PT)

(72) Inventors: Francisco Alexandre Ganho Da Silva Reis, Sacavém (PT); Rui Pinto Quádrio Alves, Sacavém (PT); Caihao Liang, Sacavém (PT); Xiang Zutao, Sacavém (PT)

(73) Assignee: CENTRO DE INVESTIGAÇÃO EM ENERGIA REN-STATE GRID S.A, Sacavém (PT)

( * ) Notice: Subject to any disclaimer, the term of this patent is extended or adjusted under 35 U.S.C. 154(b) by 0 days.

(21) Appl. No.: 16/325,103

(22) PCT Filed: Aug. 14, 2017

(86) PCT No.: PCT/IB2017/054947
§ 371 (c)(1),
(2) Date: Feb. 12, 2019

(87) PCT Pub. No.: WO2018/029662
PCT Pub. Date: Feb. 15, 2018

(65) Prior Publication Data
US 2019/0363542 A1    Nov. 28, 2019

(30) Foreign Application Priority Data
Aug. 12, 2016    (PT) ........................................ 109582

(51) Int. Cl.
*H02J 3/38*    (2006.01)
*F03D 7/02*    (2006.01)
(Continued)

(52) U.S. Cl.
CPC ............ *H02J 3/386* (2013.01); *F03D 7/0284* (2013.01); *F03D 7/048* (2013.01); *H02J 3/001* (2020.01); *H02J 3/003* (2020.01)

(58) Field of Classification Search
CPC .. H02J 3/386; H02J 3/001; H02J 3/003; H02J 3/00; F03D 7/0284; F03D 7/048; Y02E 10/723; Y02E 10/763
(Continued)

(56) References Cited

U.S. PATENT DOCUMENTS

| 9,373,960 B2 | 6/2016 | Pande et al. |
| 2012/0104754 A1* | 5/2012 | Rudolf .................. F03D 7/0284 290/44 |

(Continued)

FOREIGN PATENT DOCUMENTS

| CN | 104333047 A | 2/2015 |
| CN | 104362639 A | 2/2015 |

(Continued)

OTHER PUBLICATIONS

Energy management by generator rescheduling in congestive deregulated power system, by: J. Jeslin Drusila Nesamalar, P. Venkatesh, S. Charles Raja, Available online Mar. 23, 2016.*

(Continued)

*Primary Examiner* — Jigneshkumar C Patel
(74) *Attorney, Agent, or Firm* — Leason Ellis LLP

(57) ABSTRACT

A method for wind power curtailment optimization comprises calculating the power flow for a power network for the day-ahead; calculating a contingency analysis for the power network for the day-ahead, comprising forecasted power generation, power consumption and topology of said power network, together with a set of contingency scenarios; calculating a sensitivity factor of a power flow for each power network branch to a power injection by each wind (Continued)

power plant, wherein the sensitivity factor is calculated only for the periods of time of the day-ahead for which overloaded branches have been detected during the solving of the power flow or during the solving of the contingency analysis; selecting a subset of the wind power plants having at least one sensitivity factor above a predetermined threshold as curtailment candidates; and calculating the wind power curtailment restricted to the selected subset of wind power plants.

14 Claims, 7 Drawing Sheets

(51) Int. Cl.
  *F03D 7/04* (2006.01)
  *H02J 3/00* (2006.01)
(58) Field of Classification Search
  USPC .......................................................... 700/287
  See application file for complete search history.

(56) References Cited

U.S. PATENT DOCUMENTS

| | | | |
|---|---|---|---|
| 2013/0055133 A1* | 2/2013 | Mehta | H02J 13/0062 715/771 |
| 2014/0152010 A1* | 6/2014 | Larsen | F03D 7/00 290/44 |
| 2019/0162166 A1* | 5/2019 | Jessen | H02J 13/0004 |

FOREIGN PATENT DOCUMENTS

| | | |
|---|---|---|
| CN | 104993524 A | 10/2015 |
| WO | 2011/101189 | 8/2011 |

OTHER PUBLICATIONS

Nesamalar J Jeslin Drusila et al, "Energy management by generator rescheduling in congestive deregulated power system", Applied Energy, Elsevier Science Publishers, GB, (Mar. 23, 2016), vol. 171, doi:10.1016/J.APENERGY.2016.03.029, ISSN 0306-2619, pp. 357-371.

R. Alves, "Stochastic location of FACTS devices in electric power transmission networks (Msc Thesis)", Faculty of Engineering of the University of Porto, (Jul. 31, 2013), URL: https://sigarra.up.pt/feup/pt/pub_geral.show_file?pi_gdoc_id=359971, (Oct. 31, 2017).

Wiest Pascal et al, "Dynamic curtailment method for renewable energy sources in distribution grid planning", 2016 IEEE Power and Energy Society General Meeting (PESGM), IEEE, (Jul. 17, 2016), doi:10.1109/PESGM.2016.7741410, pp. 1-5.

Gu Yingzhong et al, Fast Sensitivity Analysis Approach to Assessing Congestion Induced Wind Curtailment, IEEE Service Center, Piscataway, NJ, US, IEEE Transactions on Power Systems, (Jan. 1, 2014), pp. 101-110.

"EPSO—evolutionary particle swarm optimization, a new algorithm with applications in power systems", V. Miranda; N. Fonseca, Transmission and Distribution Conference and Exhibition 2002: Asia Pacific, IEEE/PES, (2002), pp. 745-750.

V. Miranda and N. Fonseca, "EPSO—best-of-two-worlds metaheuristic applied to power system problems", Evolutionary Computation, 2002. CEC '02. Proceedings of the 2002 Congress on, Honolulu, HI, 2002, pp. 1080-1085.

V. Miranda and N. Fonseca, "EPSO—evolutionary particle swarm optimization, a new algorithm with applications in power systems", Transmission and Distribution Conference and Exhibition 2002: Asia Pacific. IEEE/PES, 2002, pp. 745-750.

V. Miranda and R. Alves, "PAR/PST location and sizing in power grids with wind power uncertainty", Probabilistic Methods Applied to Power Systems (PMAPS), 2014 International Conference on, Durham, 2014, pp. 1-6.

R. Alves, "Stochastic location of FACTS devices in electric power transmission networks", MSc Thesis, Faculty of Engineering of the University of Porto, Jul. 2013.

Ministério do Ambiente, Ordenamento do Território e Energia, "Decreto-Lei n° 94/2014", Available at: https://dre.pt/application/file/25677141 (in Portuguese language).

Alrashidi et al.; "A Survey of Particle Swarm Optimization Applications in Electric Power Systems,", IEEE Transactions on Evolutionary Computation, vol. 13, No. 4, pp. 913-918, Aug. 2009.

del Valle et al.; "Particle Swarm Optimization: Basic Concepts, Variants and Applications in Power Systems," Evolutionary Computation, IEEE Transactions on Voluntary Computation, vol. 12, No. 2, pp. 171-195, Apr. 2008.

Coath et al.; "Particle swarm optimizationfor reactive power and voltage control with grid-integratedwind farms,", Proc. IEEE Power Eng. Soc. General Meeting, pp. 303-308, 2004.

* cited by examiner

METHOD AND DEVICE FOR WIND POWER CURTAILMENT OPTIMIZATION FOR DAY-AHEAD OPERATIONAL PLANNING OF A POWER NETWORK

CROSS-REFERENCE TO RELATED APPLICATIONS

This application is a U.S. National Stage Application under 35 U.S.C. § 371 of International Patent Application No. PCT/IB2017/054947, filed Aug. 14, 2017, which claims priority to Portugal Application No. 109582, filed Aug. 12, 2016, which are hereby incorporated by reference in their respective entireties.

TECHNICAL FIELD

The present disclosure relates to a method and device for wind power curtailment optimization for day-ahead operational planning for power networks.

BACKGROUND

The generalized commitment towards decarbonisation of energy systems through integration of renewable energy sources (RES) has been around for a while. As the share of RES penetration grows, the power systems' operational activity faces increasing uncertainty and complexity.

In particular, the technical challenges brought by the fact that more distributed wind power plants may cause overload of power transformers and lines in meshed transmission and distribution networks are becoming critical to be addressed. Ever more frequent unconventional and bi-directional power flows, causing network bottlenecks under high wind power penetration, may not be a straightforward challenge to tackle.

The curtailment of wind power is a possible mean to overcome congestion problems that needs to be well rationalized by grid operators and typically used only as a last resource solution. To ensure that most efficient decisions are taken when curtailing wind power, system operators need to move away from common sense based decisions to near optimal curtailment solutions grounded by well-established technical and economic criteria.

The decision-making by system operators to curtail wind power is somehow contradictory to the paradigm of maximizing RES (renewable energy sources) integration into energy systems, but occasionally required to avoid overload of elements. Because of such contradiction, it is essential to guarantee that only a minimum amount of wind power is curtailed strictly when necessary. Moreover, by properly approaching the wind power curtailment problem system operators bring more transparency to their activities and the fairest curtailment signals to wind power producers.

In the event of wind power curtailment need, system operators have to identify which wind power plants are contributing to network bottlenecks and decide the ones to curtail and how much. Due to limited controllability of power flows and dependency on branches' impedance, this may turn into a complex problem to solve, especially in cases of highly meshed networks where wind power plants in several locations differently contribute to existing overloads.

REFERENCES

[1] V. Miranda and N. Fonseca, "EPSO—best-of-two-worlds meta-heuristic applied to power system problems", Evolutionary Computation, 2002. CEC '02. Proceedings of the 2002 Congress on, Honolulu, Hi., 2002, pp. 1080-1085.

[2] V. Miranda and N. Fonseca, "EPSO-evolutionary particle swarm optimization, a new algorithm with applications in power systems", Transmission and Distribution Conference and Exhibition 2002: Asia Pacific. IEEE/PES, 2002, pp. 745-750

[3] V. Miranda and R. Alves, "PAR/PST location and sizing in power grids with wind power uncertainty", Probabilistic Methods Applied to Power Systems (PMAPS), 2014 International Conference on, Durham, 2014, pp. 1-6.

[4] R. Alves, "Stochastic location of FACTS devices in electric power transmission networks", MSc Thesis, Faculty of Engineering of the University of Porto, July 2013.

[5] Ministério do Ambiente, Ordenamento do Territorio e Energia, "Decreto-Lei no. 94/2014", Available at: https://dre.pt/application/file/25677141 (in Portuguese language).

The above references should be considered herewith incorporated in their entirety. These facts are disclosed in order to illustrate the technical problem addressed by the present disclosure.

GENERAL DESCRIPTION

In this disclosure a method for curtailing wind power is disclosed. It aims to provide close to optimum wind power curtailment solutions on hourly basis for day-ahead operational planning purposes, constrained by economic, technical, security and regulatory principles. The ex-ante assessment of the electrical grid allows system operators to anticipate network constraints and take best wind power curtailment decisions in a timely manner.

The method is validated on a case-study based on the Portuguese transmission power system. Obtained results show the capability of the method to achieve near optimal curtailment solutions when applied to complex and large-scale power systems.

Due to the combinatorial nature of the problem addressed, different wind power plant locations and corresponding power curtailment levels, a heuristic-based algorithm is used to provide quasi optimal curtailment solutions to the system operator.

A day-ahead operational planning method, for deciding how much wind power to curtail and where under scenarios of network bottlenecks. The Evolutionary Particle Swarm Optimization [1] algorithm is preferably used enabling said heuristic-based algorithm to provide robust wind power curtailment solutions at minimum cost for power system operators.

The problem of optimizing wind power curtailment must be addressed by grid operators to ensure the most cost-efficient operation of the system. Each unit of wind power curtailed at a certain location i, $Pc_i$ often comes at a cost, $\alpha_i$, to grid operators. Therefore, the minimization of the objective function of Eq. 1 provides the minimum wind power curtailment costs:

$$\min J = \sum_{i=1}^{N} \alpha_i \times Pc_i \qquad (1)$$

Where the sum of the partial curtailment costs, at each location i, over N wind power plants, potentially contributing to overload of branches, results in the total curtailment costs for the system.

In more advanced versions of the problem, the non-compliance of curtailment solutions with particular technical requirements, generally highly valued by grid operators, can also influence the curtailment decision. Rather than simply considering the costs of power curtailed in the optimization problem, the system operator may be willing to curtail additional wind power to ensure that wind generators with advanced grid support capabilities stay connected to the grid.

Concretely, the ability of wind plants to continuously generate power in face of a voltage drop, often recognized as low voltage ride through (LVRT) capability, is becoming an increasingly valuable feature to grid operators. Under operational scenarios where a significant share of consumption is supplied by wind power plants, it is technically relevant to ensure the highest possible ratio of wind turbines with LVRT capability connected to the grid. Because of its perceived value, one may include in the objective function of Eq. 1 a cost factor, $\beta_i$, to represent the cost of LVRT capability absence at each wind power plant location i:

$$\min J = \sum_{i=1}^{N} (\alpha_i + \beta_i) \times Pc_i \qquad (2)$$

In Eq. 2 wind power curtailment solutions that result in a decreased amount of power from wind plants with LVRT capability are penalized. In principle, the factor $\beta_i$ is significantly lower than $\alpha_i$ and equal to a very small value for wind plants without LVRT capability. This means that curtailment priority is given to wind power plants without LVRT capability when having more than one wind power plant similarly contributing to overload of branches.

A further complex approach to the wind power curtailment problem arises when trying to reflect curtailment rules imposed by country's legislation into the objective function of the problem. In this particular case, one aims to consider differentiated curtailment costs for wind plant at location i based on the concept of over-equipped wind power plants.

In order to improve RES penetration levels, over-equipped wind power plants have a rated power that is greater than the maximum power they are normally authorized to inject into the grid (i.e. connection power).

During high wind speed periods, when the output power of the wind plant is greater than its connection power, the system operator may allow the injection into the network of the excess of wind power associated with the over-equipment.

As a counterpart, wind power producers allow that the amount of wind power injected above the authorized connection power can be curtailed at no cost whenever requested by the grid operator (e.g. the case of the wind power curtailment procedure of the Portuguese power system [5]).

As shown in FIG. 1, this results in two different alternatives of wind power curtailment for over-equipped power plants:

1) Over-equipment wind power curtailment (Pco)—referring to the amount of power curtailed above the connection power at no cost for system operator;

2) Wind power curtailment (Pc)—referring to the amount of power curtailed below the connection power at a cost $\alpha_i$ for system operators.

It is possible to map this principle to the objective function of the problem, so that system operators prioritize the over-equipment power curtailment to minimize overall costs:

$$\min J = \sum_{i=1}^{M} \beta_i \times Pco_i + \sum_{i=1}^{N} (\alpha_i + \beta_i) \times Pc_i \qquad (3)$$

In Eq. 3 M is a subset of N, including only over-equipped power plants potentially contributing to overload of branches and $Pco_i$ is the amount of over-equipment power curtailed at a certain location i. Despite $\alpha_i$ being equal to 0 (no curtailment cost) for the term regarding $Pco_i$, it is still necessary to include the cost factor $\beta_i$ to guarantee that curtailment preference is given to over-equipped wind power plants without preferred capabilities, for example a LVRT capability.

The constraints of the wind power curtailment problem are defined by technical and security principles related to power system's operation. Those are typical power flow equations, where generation meets demand plus system losses and loading of branches is within technical limits:

$$F_j^{Min} \leq F_j \leq F_j^{Max} \qquad (4)$$

With $F_j$ being the power flowing through a branch j and $F_j^{Max}$ and $F_j^{Min}$ its maximum and minimum technical limits. To comply with security requirements of system operators, problem's constraints must also be met under (N−1) contingency criteria (single loss of any network element, as defined by ENTSO-E for example).

Additionally, decision variables of the problem, $Pc_i$ and $Pco_i$, are subject to constraints according to Eq. 5 and Eq. 6:

$$Pc_i^{Min} \leq Pc_i \leq Pc_i^{Max} \qquad (5)$$

$$Pco_i^{Min} \leq Pco_i \leq Pco_i^{Max} \qquad (6)$$

Where wind power curtailment limits at location i, $Pc_i^{Min}$, $Pc_i^{Max}$, $Pco_i^{Min}$ and $Pco_i^{Max}$, are defined based on the assessment of wind power generation patterns.

The method disclosed aims at solving the wind power curtailment problem for day-ahead operational planning purposes. It evaluates the forecasted operational conditions of a network on hourly basis, identifies its potential bottlenecks and supports decision making of grid operators by providing best wind power curtailment solutions to overcome possible overloads.

At large-scale dimension, where perhaps hundreds of wind power plants may represent a very significant number of decision variables to the curtailment problem, it is critical to ensure the computational efficiency of the method. Power system operators require accurate solutions within a limited period of time. The following presented method delivers, in a time frame compatible with system operator's operational activities, efficient wind power curtailment solutions.

The initial step of the method consists on a day-ahead network assessment. At this stage the input data is received concerns day-ahead forecasted generation, consumption and network topology.

An AC power flow is solved for each of the 24 hours based on input data received. On hourly basis, the existence of network bottlenecks is evaluated. In case of congestion problems, overloaded branches and transformers are identified for each hour.

After having evaluated the day-ahead operating conditions of the network, a security assessment is performed to check compliance with (N−1) criteria (single loss of any network element, as defined by ENTSO-E for example) in each of the 24 hours. Accordingly, a contingency analysis is executed to identify branches overload under single contingency scenarios.

The (N−1) contingency analysis is a computationally consuming activity of the method that if not efficiently executed can result in high processing time. Especially when dealing with large-scale power systems a huge number of single contingency scenarios are likely to be assessed, resulting in a considerable amount of AC power flow problems to be solved. To overcome this difficulty, ensuring the applicability of the method to complex power systems, a parallel processing contingency analysis is preferably performed to reduce processing time of the simulation (FIG. 2).

Parallel processing contingency analysis can be ensured using dedicated power system's software with substantial impact on overall processing speed. The disclosed method takes advantage of the fact that today's off-the-shelf computers incorporate several CPU cores to which single contingency scenarios can be allocated in parallel, enhancing the performance of the method for large-scale power systems.

A sensitivity analysis is performed preferably only for the hours in which overload of branches has been detected during the day-ahead network or security assessments (FIG. 4).

The sensitivity analysis determines the impact of changing power injections in branch flows. In the scope of this method it is used to identify wind power plants contributing to overload of branches which are potential candidates to be curtailed in order to overcome overload problems. The sensitivity factor, $s_{ji}$, of a flow in branch j, $F_j$, to a power injection by a wind power plant at location i, $PGen_i$, is defined in eq. 7 as:

$$s_{ji} = \frac{\partial F_j}{\partial PGen_i} \quad (7)$$

By performing the sensitivity analysis for each branch in overload conditions, wind power plants affecting the branch flow with a sensitivity factor greater than certain threshold (sensitivity factor cutoff) are selected to define the set of decision variables of the wind power curtailment problem.

For example, for a given network, any wind power plant having at least one sensitivity factor above a global threshold will be selected to define the set of decision variables.

This ensures that from a large number of wind power plants in a real power system, only the ones contributing to overload problems are considered in the wind power curtailment optimization problem. With this approach, illustrated in FIG. 3, the dimension of the problem can be considerably reduced due to a smaller set of decision variables.

The appropriate definition of the sensitivity factor cutoff value is important to ensure both accuracy and computational efficiency of the methodology, but within the skills of the average skilled person in the field, for example by a routine test of a small number of candidate thresholds, given that the actual value of the threshold will vary from network to network. An illustrative example is shown in FIG. 3. If on one hand, a very small value of the sensitivity factor cutoff is likely to result in a larger set of decision variables of the wind power curtailment problem and the complexity of the computational problem is not reduced (having into consideration in the optimization process wind power plants with low impact on overloaded branch flow). On the other hand, a larger value of the sensitivity factor cutoff will result in a smaller set of decision variables (considering only wind power plants with higher impact on overloaded branch power flow), with probably an impact on results' accuracy as the selected wind power plants will be less representative of the network and the wind power curtailment solution will be markedly inferior (or very hard to obtain). A good compromise needs to be found between results' accuracy and computational efficiency of the methodology, especially when applied to large-scale power systems, in order to find the right sensitivity factor cutoff values.

After having identified the day-ahead network overloads (from day-ahead network and security assessments) and selected the wind power plants contributing to detected network congestions (from sensitivity analysis), the wind power curtailment optimization problem is solved for the restrict set of identified wind power plants.

Due to the combinatorial nature of the problem, the method preferably makes use of the Evolutionary Particle Swarm Optimization (EPSO) [1] to optimize the wind power curtailment, but other optimization methods may be used. This algorithm is further discussed in this disclosure, as well as its application to the wind power curtailment problem.

The described method for optimizing wind power curtailment for day-ahead operational planning is summarized in the flowchart of FIG. 4.

Heuristic methods are often used to optimize highly complex problems, namely the ones of a combinatorial nature. In the particular case of power systems, heuristics are a popular tool to solve different problems from daily operation to long-term planning. The dimension of such problems, together with the need to obtain good solutions within a limited period of time, favours the use of heuristics techniques [4].

The Evolutionary Particle Swarm Optimization (EPSO) is proposed by Miranda et al. [1] and puts together concepts from both Evolutionary Algorithms (EA) and Particle Swarm Optimization (PSO). Gathering the advantages of EA and PSO, EPSO has proven to be a successful algorithm with very interesting convergence properties [1-4].

EPSO, as a hybrid algorithm, uses the same movement rule of PSO, where the swarm (set of particles) evolves in the search space, with the particularity of its strategic parameters being defined according to a self-adaptive evolution strategy procedure introduced by the principles of EA. EPSO thus results in an enhanced version of PSO, in which the definition of initial values of the strategic parameters is not crucial as in PSO, considerably improving convergence possibilities [1, 4].

In EPSO, from one iteration to the other, each particle (possible solution of the problem) $X_i$ obeys to a movement rule which depends on a velocity term $V_i^{New}$, which in turn depends on three main factors known as inertia, memory and cooperation:

$$X_i^{New} = X_i + V_i^{New} \quad (8)$$

$$V_i^{New} = w^*_{i0} V_i + w^*_{i1}(b_i - X_i) + w^*_{i2}(b^*_g - X_i) \quad (9)$$

The first term of $V_i^{New}$ represents the inertia of the particle, making it to move in the direction it has preciously moved. The second term represents the memory of the particle making its movement being attracted to the best point found by the particle in its past life, $b_i$. The last term denotes cooperation, with the particles exchanging information to define the current best point ever found by the swarm, $b_g$, and moving in that direction [1, 4].

According to Eq. 9, and in opposition to what happens with PSO, the weights of each term, $w^*_{ik}$, undergo a mutation process, defined as following:

$$w^*_{ik} = w_{ik}[\text{Log } N(0,1)]^\tau \qquad (10)$$

Where $\tau$ is the learning rate of the algorithm, externally defined to control mutation amplitudes. In EPSO, the global best, $b^*_g$ in Eq. 11, is randomly distributed based on a Gaussian distribution and on a new weight, $w^*_{i3}$, which is also subject to a mutation process:

$$b^*_g = b_g + w^*_{i3} N(0,1) \qquad (11)$$

The approach of EPSO consists of a replication process where each particle is replicated r times, originating identical particles, followed by the mutation of the weights of each particle. Then, a reproduction process of the particles is performed, based on the movement rule described, generating a set of offspring. Each offspring is consequently evaluated by a fitness function and selected based on its fitness, forming a new generation of particles. This process is repeated for several generations until a certain stop criterion is reached [1, 4].

For the disclosed method using the EPSO algorithm, each particle of the swarm is a possible solution to the wind power curtailment problem. The particle structure is defined based on the sensitivity analysis performed, where each wind power plant contributing to branch overload is represented. The particle structure adapts dynamically for every hour with different congestion profiles.

Elements of a particle denote the total amount of wind power curtailed at a location i, $Pc_i$, as represented in FIG. 5:

Particles are evaluated based on the fitness function of Eq. 3, thus classified according to their associated curtailment costs. The obtained fitness value of a particle is penalized by adding a high constant value whenever congestion problems persist to ensure selection of particles solving network overloads. This requires evaluating the network conditions for each wind power curtailment profile (particle) by solving an AC power flow and checking compliance with (N−1) criteria through contingency analysis, as represented in FIG. 4.

It is thus disclosed a method for wind power curtailment optimization for day-ahead operational planning of an electrical power network comprising a set of wind power plants, said method comprising:
calculating the power flow for the power network for the day-ahead, comprising forecasted power generation, power consumption and topology of said power network; calculating a contingency analysis for the power network for the day-ahead, comprising forecasted power generation, power consumption and topology of said power network, together with a set of contingency scenarios;
calculating a sensitivity factor of a power flow for each power network branch to a power injection by each wind power plant, wherein the calculating of the sensitivity factor is carried out only for the periods of time of the day-ahead for which overloaded branches have been detected during the solving of the power flow or during the solving of the contingency analysis;
selecting a subset of the wind power plants having at least one sensitivity factor above a predetermined threshold as curtailment candidates;
calculating the wind power curtailment restricted to the selected subset of wind power plants.

In a preferred embodiment, the wind power curtailment is calculated using Evolutionary Particle Swarm Optimization, EPSO, wherein each EPSO particle is a possible solution to the wind power curtailment calculation.

In a further preferred embodiment, an evaluation of particles for selection by the EPSO comprises calculating the power flow for the power network for each EPSO particle and calculating the contingency analysis for the power network for each EPSO particle.

In an even further preferred embodiment, each EPSO particle is comprised by the amount of power curtailed for each of the selected subset of the wind power plants.

In a preferred embodiment, the EPSO particles are evaluated using the fitness function:

$$\min J = \sum_{i=1}^{N} (\alpha_i + \beta_i) \times Pc_i$$

wherein N is the number of selected wind power plants; $\alpha_i$ is the cost of curtailed power at wind power plant i; $\beta_i$ is the cost of LVRT capability absence at wind power plant i; $Pc_i$ is the amount of power curtailed at wind power plant i.

In a preferred embodiment, the EPSO particles are evaluated using the fitness function:

$$\min J = \sum_{i=1}^{M} \beta_i \times Pco_i + \sum_{i=1}^{N} (\alpha_i + \beta_i) \times Pc_i$$

wherein N is the number of selected wind power plants; M is a subset of N including only wind power plants having over-equipped power, i.e. an amount of rated power above the connection power; $\alpha_i$ is the cost of curtailed power at wind power plant i; $\beta_i$ is the cost of LVRT capability absence at wind power plant i; $Pc_i$ is the amount of power curtailed at wind power plant i below the connection power of wind power plant i; and $Pco_i$ is the amount of power curtailed at wind power plant i above the connection power of wind power plant i.

In a preferred embodiment, the sensitivity factor $s_{ji}$ of power flow in a power network branch to a power injection by a wind power plant, is:

$$s_{ji} = \frac{\partial F_j}{\partial PGen_i}$$

wherein $\partial F_j$ is an increment in power flow in the power network branch j due to an increment $\partial PGen_i$ in power injected by wind power plant i.

In a preferred embodiment, the contingency analysis is carried out for single contingency scenarios of one, and only one, network element being out of service.

In a further preferred embodiment, the contingency analysis is carried out in parallel for each of the contingency scenarios, in particular each of the contingency scenarios is assigned to a single mono-core CPU or to a single core of a multi-core CPU.

In a further preferred embodiment, the method is carried out on 24 hourly increments for the 24 hours of the day-ahead operational planning of the network.

It is also described a device for wind power curtailment optimization for day-ahead operational planning of an electrical power network comprising a plurality of wind power plants, said device being configured for carrying out the method of any of the above methods.

It is also disclosed a non-transitory storage media including program instructions for implementing a method for wind power curtailment optimization for day-ahead operational planning of an electrical power network comprising a set of wind power plants, the program instructions including instructions executable to carry out the method of any of the above methods.

It is also described a device for wind power curtailment optimization comprising the above non-transitory storage media.

BRIEF DESCRIPTION OF THE DRAWINGS

The following figures provide preferred embodiments for illustrating the description and should not be seen as limiting the scope of invention.

DETAILED DESCRIPTION

The Portuguese transmission system was used to assess the performance of the disclosed wind power curtailment method in a large-scale power system. The transmission network includes +1000 buses and +400 generation units from which around 110 are wind power plants.

Figure 6:
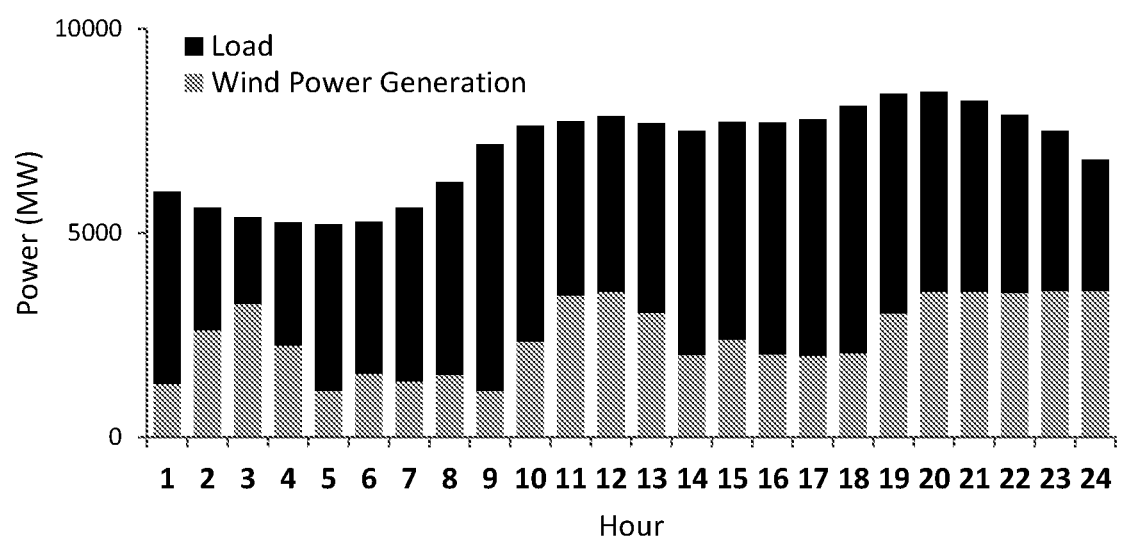
FIG. 6: Schematic representation of an embodiment of representative 24-hour load and wind power generation profiles.

Illustrative day-ahead scenarios of high wind power penetration have been considered, as the one represented in FIG. 6, to intentionally cause overloads in the system.

The 24-hour network assessment has highlighted network congestions in hour 20 with peak load and high wind power penetration conditions. In a first approach, without performing the security assessment, two branches are overloaded (i.e. load above 100%) (see FIG. 7):

TABLE I

Overload of branches detected in hour 20.

| From Bus | To Bus | Branch Type | Branch Load (%) |
|---|---|---|---|
| 655 | 693 | Line | 113 |
| 687 | 287 | Transformer | 117 |

Figure 8:
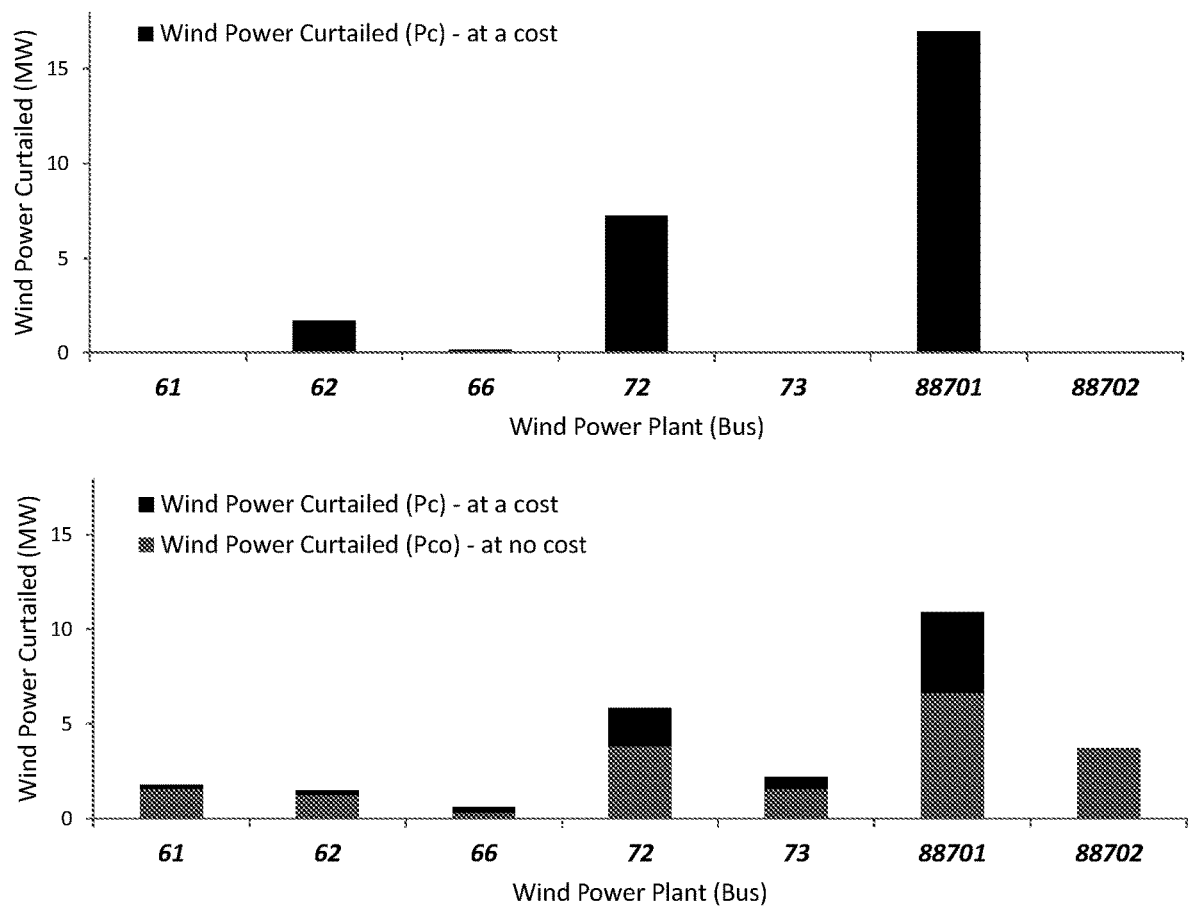
FIG. 8: Schematic representation of an embodiment of wind power curtailment results according to the formulation of Eq. 1 (upper figure) and Eq. 3.

The wind power curtailment is optimized based on the method developed. Results are presented in Table II and consider the two different approaches of Eq. 1 and Eq. 3 (see also FIG. 8).

The wind power curtailment solutions of Table II solve the identified congestion problems. Indeed, in both approaches of Eq. 1 and Eq. 3, after curtailing wind power plants according to the obtained results, the two branches 655-693 and 687-287 operate with an approximate load of 100% as shown in FIG. 7a.

TABLE II

Wind power curtailment results.

| Wind Plant | Rated Power (MW) | Generated Power (MW) | Curtailment Cost Factor - α | LVRT Capability | LVRT Cost Factor - β |
|---|---|---|---|---|---|
| WP 61 | 9.55 | 9.55 | 82 | Yes | 2.5 |
| WP 62 | 7.46 | 7.46 | 74 | No | 0.001 |
| WP 66 | 1.99 | 1.99 | 70 | Yes | 2.5 |
| WP 72 | 22.89 | 22.89 | 61 | No | 0.001 |
| WP 73 | 9.55 | 9.55 | 82 | Yes | 2.5 |
| WP 88701 | 42 | 39.80 | 61 | Yes | 2.5 |
| WP 88702 | 32.6 | 29.85 | 70 | No | 0.001 |

| Use of Eq. 1 | Use of Eq. 3 |
|---|---|
| Curtailed Power (MW) | |
| 0 | 1.78 |
| 1.67 | 1.51 |
| 0.16 | 0.63 |
| 7.24 | 5.82 |
| 0 | 2.20 |
| 16.96 | 10.89 |
| 0 | 3.72 |
| Fitness Value | |
| 1661.46 | 711.52 |

In the results regarding the formulation of Eq. 1, where the goal is to minimize curtailment costs based exclusively on the value of $\alpha$, it is clear that the method provides a solution in which curtailment occurs in wind power plants with lowest curtailment costs −$\alpha$. While WP72 has a great impact on overload of branch 655-693, WP62 and WP88701 impact the power flow in branch 687-287. On the other hand, the approach of Eq. 3 results in a more distributed power curtailment over the different wind plants, as expected. Since an over-equipment of 20% was considered for each wind plant, the method provides a solution that first explores the curtailment of over-equipment power in each plant, Pco, at no cost for system operator. Only when the total over-equipment power is curtailed, the remaining power curtailment, Pc, at a cost for system operator, is made at plants WP72 and WP88701 with the lowest curtailment cost, $\alpha$, for the system operator. In a second step, when including the security assessment in the method, additional branches in overload conditions are detected due to non-compliance with (N−1) criteria.

TABLE III

Overload of branches detected in hour 20 with security assessment.

| From Bus | To Bus | Branch Type | Branch Load (%) |
|---|---|---|---|
| 655 | 693 | Line | 113 |
| 687 | 287 | Transformer | 117 |
| 69 | 687 | Line | Overload under (N-1) contingency |
| 690 | 190 | Transformer (1) | Overload under (N-1) contingency |
| 690 | 190 | Transformer (2) | Overload under (N-1) contingency |

Figure 7:
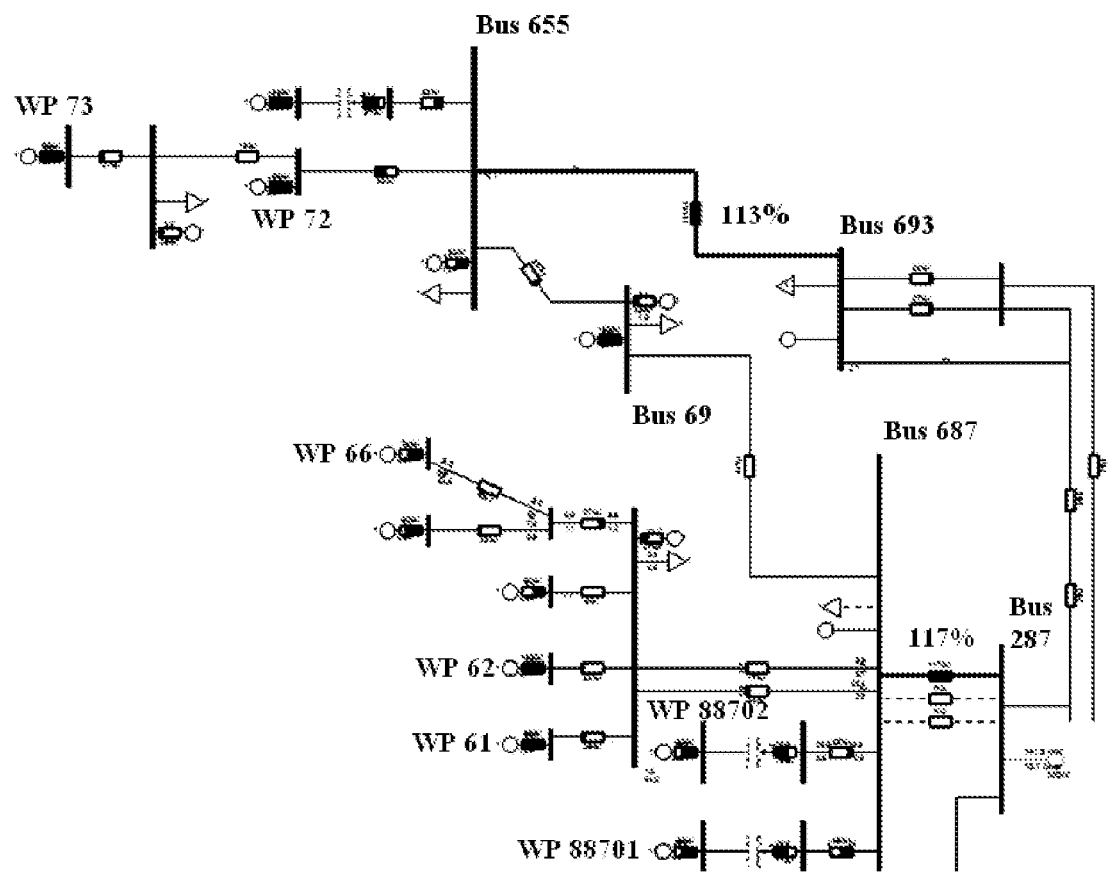
FIG. 7: Schematic representation of an embodiment of an area of the network with overloads detected (branch flows above 100% of the nominal rate): Hour 20.
Figure 7A:
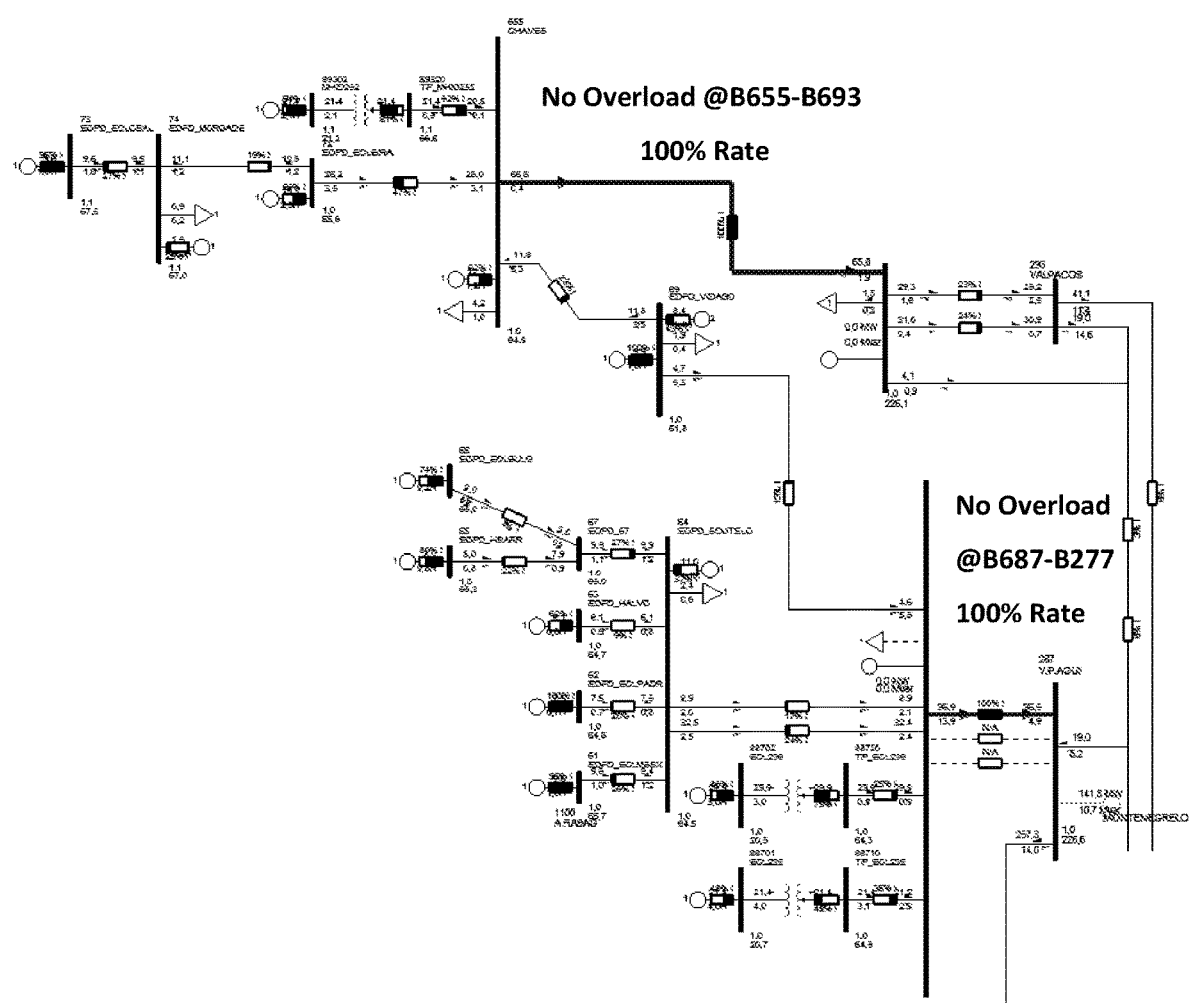
FIG. 7a: Schematic representation of an embodiment of power flow results for Hour 20 after optimal wind power curtailment.

The two transformers 690-190 are located in a different area of the network than the one represented in FIG. 7. Wind plants WP89001, WP89002 and WP89003 are the ones causing overload in branches 690-190. The optimal curtailment of wind plants to ensure compliance with (N-1) criteria is represented in Table IV.

TABLE IV

Wind power curtailment results with security assessment.

| Wind Plant | α (€/MWh) | LVRT | β (€/MWh) | Curtailed Power (MW) Equation 3 |
|---|---|---|---|---|
| WP 61 | 82 | Yes | 2.5 | 5.31 |
| WP 62 | 74 | No | 0.001 | 6.99 |
| WP 66 | 70 | Yes | 2.5 | 1.99 |
| WP 72 | 61 | No | 0.001 | 22.89 |
| WP 73 | 82 | Yes | 2.5 | 5.70 |
| WP 88701 | 61 | Yes | 2.5 | 39.80 |
| WP 88702 | 70 | No | 0.001 | 29.84 |
| WP 89001 | 71 | Yes | 10 | 0 |
| WP 89002 | 71 | Yes | 10 | 0 |
| WP 89003 | 71 | No | 0.001 | 5.06 |

It is observed that in order to comply with (N-1) criteria it is necessary to curtail more wind power and in additional locations. From the curtailment pattern of WP89001, WP89002 and WP89002 it is also possible to validate the priority given by the method to curtail wind plants without LVRT capability. Because those wind plants have similar impact on 690-190 branches' power flow (similar sensitivity factors) and the same curtailment cost α, the method prioritizes the curtailment of WP98003 due to absence of LVRT capability.

Figure 9:
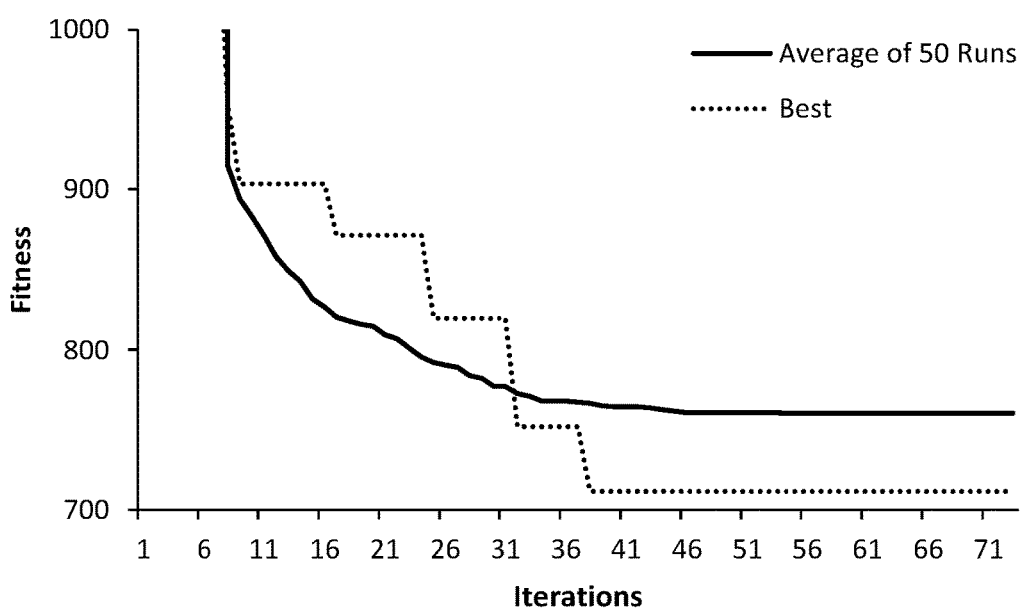
FIG. 9: Schematic representation of an embodiment of the fitness evolution of EPSO—Average of 50 runs and best run.

For a total of 50 runs, EPSO has shown good performance in optimizing the wind power curtailment problem, as represented in FIG. 9 and Table V. In all the performed runs, the algorithm has revealed the capability to solve congestion problems with near optimal wind power curtailment solutions. The demonstrated robustness is essential to increase system operators' confidence in such type of tool.

TABLE V

EPSO performance for 50 runs.

| Best | Mean - μ | Standard Deviation - σ |
|---|---|---|
| 711.52 | 760.62 | 57.12 |

The term "comprising" whenever used in this document is intended to indicate the presence of stated features, integers, steps, components, but not to preclude the presence or addition of one or more other features, integers, steps, components or groups thereof.

Figure 1:
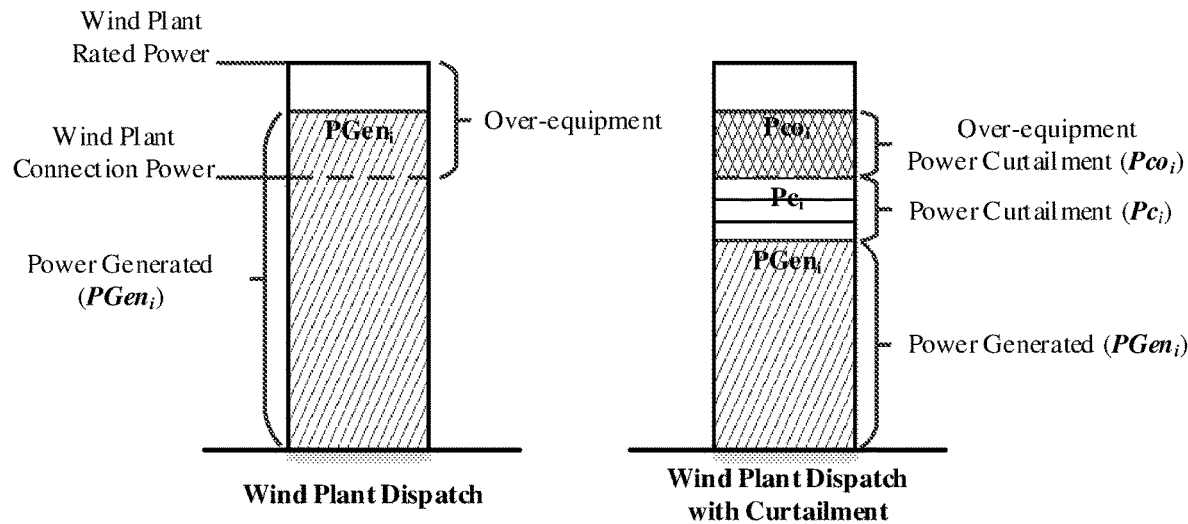
FIG. 1: Schematic representation of an embodiment of over-equipment power curtailment (Pcoi) and power curtailment (Pci).
Figure 2:
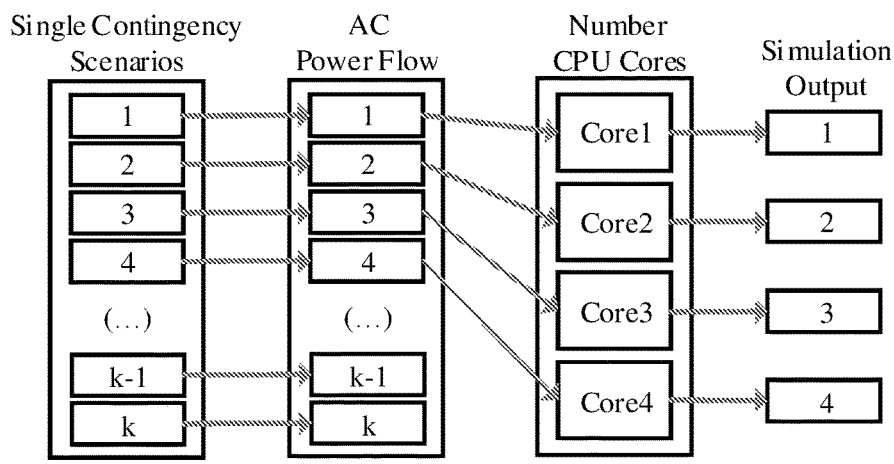
FIG. 2: Schematic representation of an embodiment of the concept of parallel processing (N−1) contingency analysis.
Figure 3:
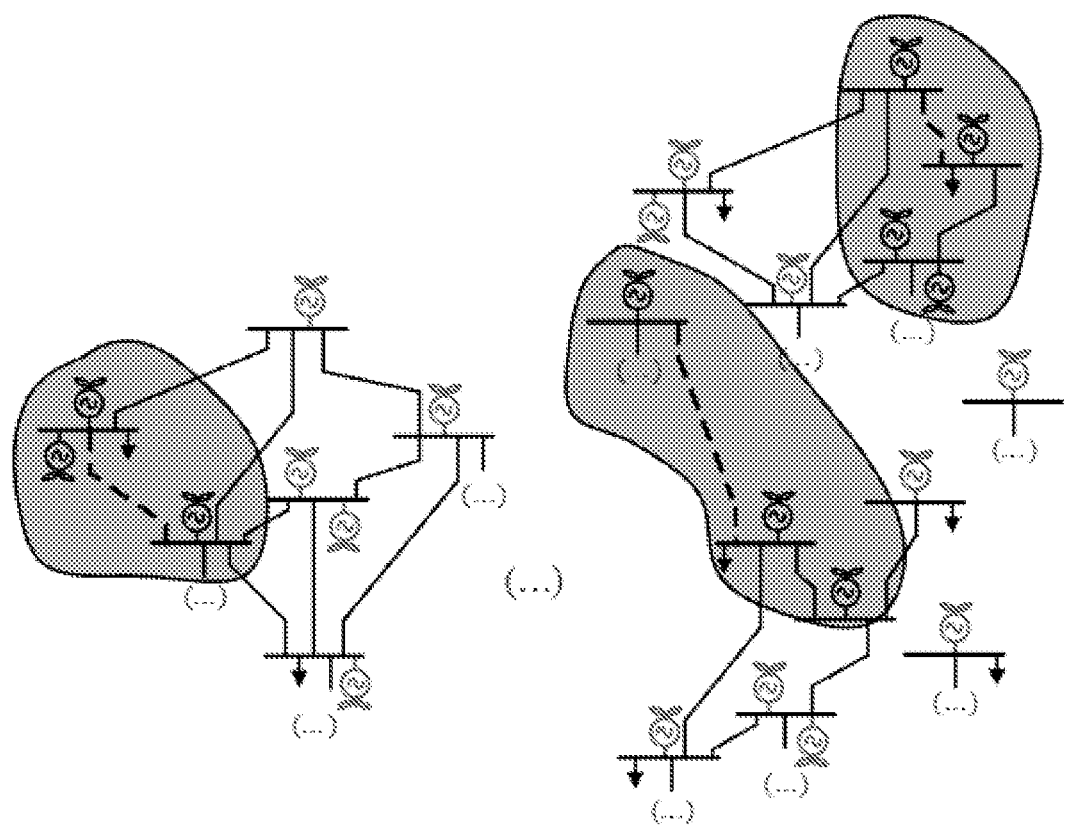
FIG. 3: Schematic representation of identification of wind power plants (grey areas—selected wind power plants with sensitivity factor greater than sensitivity factor cut-off) contributing to overload of branches (dashed) based on sensitivity analysis.
Figure 4:
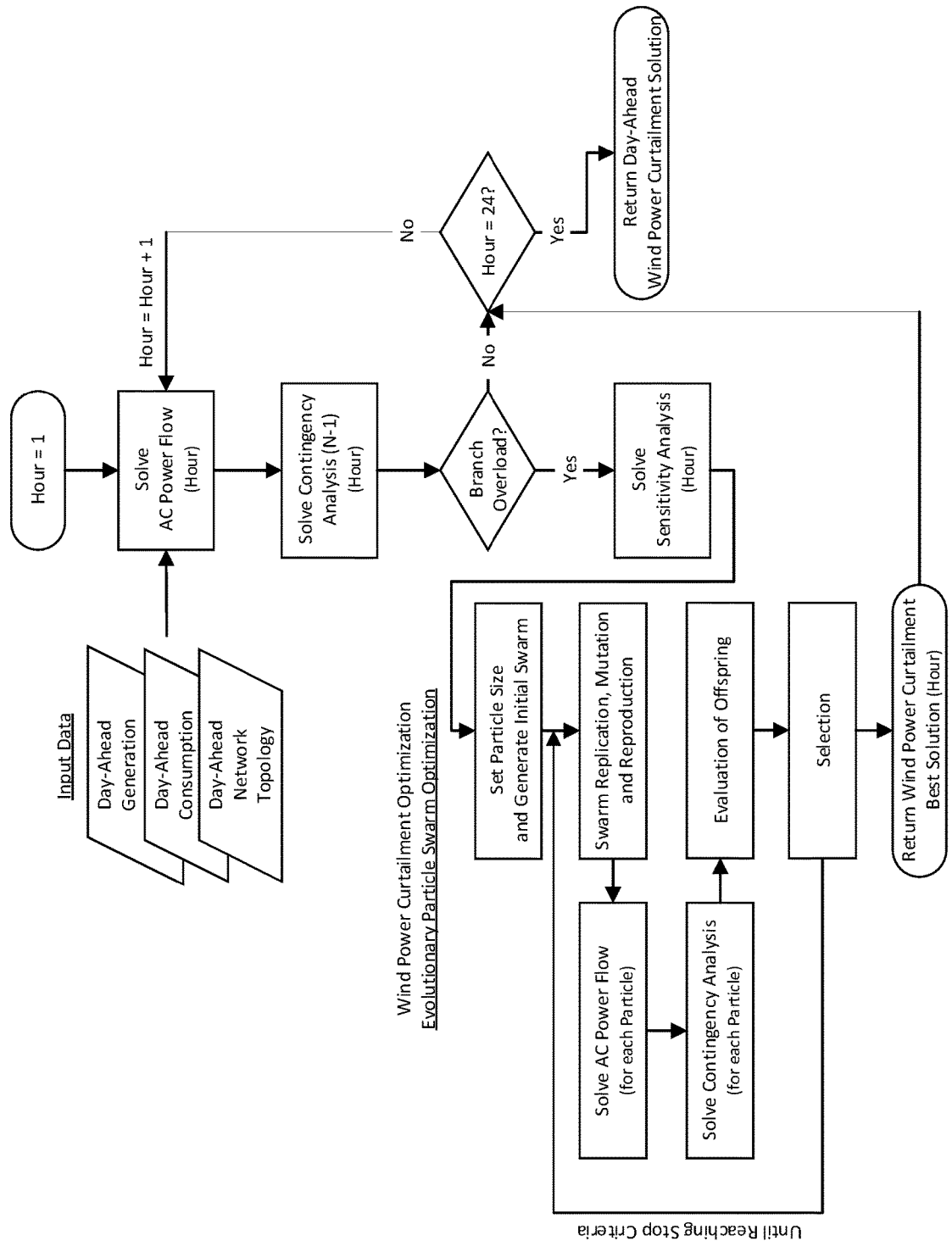
FIG. 4: Schematic representation of a flowchart of an embodiment of the disclosed method for optimizing wind power curtailment for day-ahead operational planning.
Figure 5:
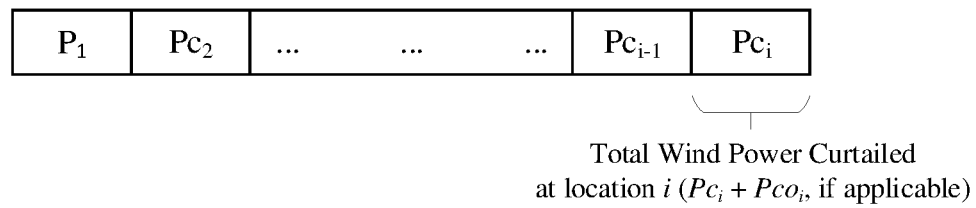
FIG. 5: Schematic representation of an embodiment of particle structure adapted to the wind power curtailment problem.

Process flow diagrams of particular embodiments of the presently disclosed methods are depicted in figures (for example, FIG. 4). The flow diagrams do not depict any particular means, rather the flow diagrams illustrate the functional information one of ordinary skill in the art requires to perform said methods required in accordance with the present disclosure. It will be appreciated by those of ordinary skill in the art that unless otherwise indicated herein, the particular sequence of steps described is illustrative only and can be varied without departing from the disclosure. Thus, unless otherwise stated the steps described are so unordered meaning that, when possible, the steps can be performed in any convenient or desirable order.

The disclosure should not be seen in any way restricted to the embodiments described and a person with ordinary skill in the art will foresee many possibilities to modifications thereof. The above described embodiments are combinable. The following claims further set out particular embodiments of the disclosure.

The invention claimed is:

1. A method for wind power curtailment optimization, for preventing network branch overload, for day-ahead operational planning of an electrical power network comprising a set of wind power plants, the method comprising:
calculating the power flow for the power network for the day-ahead, comprising forecasted power generation, power consumption and topology of the power network;
calculating a contingency analysis for the power network for the day-ahead, comprising forecasted power generation, power consumption and topology of the power network, together with a set of contingency scenarios;
calculating a sensitivity factor of a power flow for each power network branch to a power injection by each wind power plant, wherein the calculating of the sensitivity factor is carried out only for the periods of time of the day-ahead for which overloaded branches have been detected during the solving of the power flow or during the solving of the contingency analysis;
selecting a subset of the wind power plants having at least one sensitivity factor above a predetermined threshold as curtailment candidates; and
calculating the wind power curtailment restricted to the selected subset of wind power plants;
wherein the calculating of the wind power curtailment is obtained with Evolutionary Particle Swarm Optimization, EPSO, wherein each EPSO particle is a possible solution to the wind power curtailment calculation;
wherein the EPSO particles are evaluated using the fitness function:

$$\min J = \sum_{i=1}^{N} (\alpha_i + \beta_i) \times Pc_i$$

wherein N is the number of selected wind power plants; $\alpha_i$ is the cost of curtailed power at wind power plant i; $\beta_i$ is the cost of low voltage ride through, LVRT, capability absence at wind power plant i;
$Pc_i$ is the amount of power curtailed at wind power plant i; and
curtailing an amount of power at each wind power plant i by $Pc_i$.

2. The method for wind power curtailment optimization according to claim 1, wherein each EPSO particle is comprised by the amount of power curtailed for each of the selected subset of the wind power plants.

3. The method for wind power curtailment optimization according to claim 1, wherein the sensitivity factor $s_{ji}$ of power flow in a power network branch to a power injection by a wind power plant, is:

$$s_{ji} = \frac{\partial F_j}{\partial PGen_i}$$

wherein $\partial F_j$ is an increment in power flow in the power network branch j due to an increment $\partial PGen_i$ in power injected by wind power plant i.

4. The method for wind power curtailment optimization according to claim 1, wherein the contingency analysis is carried out for single contingency scenarios of one, and only one, network element being out of service.

5. The method for wind power curtailment optimization according to claim 1, wherein the contingency analysis is carried out in parallel for each of the contingency scenarios.

6. The method for wind power curtailment optimization according to claim 5, wherein each of the contingency scenarios is assigned to a single mono-core CPU or to a single core of a multi-core CPU.

7. The method for wind power curtailment optimization according to claim 1, wherein the method is carried out on 24 hourly increments for the 24 hours of the day-ahead operational planning of the network.

8. A non-transitory storage media including program instructions executable to carry out a method for wind power curtailment optimization for day-ahead operational planning of an electrical power network comprising a set of wind power plants, the method being claim 1.

9. A method for wind power curtailment optimization, for preventing network branch overload, for day-ahead operational planning of an electrical power network comprising a set of wind power plants, the method comprising:
 calculating the power flow for the power network for the day-ahead, comprising forecasted power generation, power consumption and topology of the power network;
 calculating a contingency analysis for the power network for the day-ahead, comprising forecasted power generation, power consumption and topology of the power network, together with a set of contingency scenarios;
 calculating a sensitivity factor of a power flow for each power network branch to a power injection by each wind power plant, wherein the calculating of the sensitivity factor is carried out only for the periods of time of the day-ahead for which overloaded branches have been detected during the solving of the power flow or during the solving of the contingency analysis;
 selecting a subset of the wind power plants having at least one sensitivity factor above a predetermined threshold as curtailment candidates; and
 calculating the wind power curtailment restricted to the selected subset of wind power plants;

wherein the calculating of the wind power curtailment is obtained with Evolutionary Particle Swarm Optimization, EPSO, wherein each EPSO particle is a possible solution to the wind power curtailment calculation;
wherein the EPSO particles are evaluated using the fitness function:

$$\min J = \sum_{i=1}^{M} \beta_i \times Pco_i + \sum_{i=1}^{N} (\alpha_i + \beta_i) \times Pc_i$$

wherein N is the number of selected wind power plants; M is a subset of N including only wind power plants having over-equipped power, i.e. an amount of rated power above the connection power; $\alpha_i$ is the cost of curtailed power at wind power plant i; $\beta_i$ is the cost of low voltage ride through, LVRT, capability absence at wind power plant i; $Pc_i$ is the amount of power curtailed at wind power plant i below the connection power of wind power plant i; and $Pco_i$ is the amount of power curtailed at wind power plant i above the connection power of wind power plant i; and
 curtailing by $Pc_i$ an amount of power at each wind power plant i below the connection power of wind power plant i, and
 curtailing by $Pco_i$ an amount of power at each wind power plant i above the connection power of wind power plant i.

10. The method for wind power curtailment optimization according to claim 9, wherein each EPSO particle is comprised by the amount of power curtailed for each of the selected subset of the wind power plants.

11. The method for wind power curtailment optimization according to claim 9, wherein the sensitivity factor $s_{ji}$ of power flow in a power network branch to a power injection by a wind power plant, is:

$$s_{ji} = \frac{\partial F_j}{\partial PGen_i}$$

wherein $\theta F_j$ is an increment in power flow in the power network branch j due to an increment $\partial PGen_i$ in power injected by wind power plant i.

12. The method for wind power curtailment optimization according to claim 9, wherein the contingency analysis is carried out for single contingency scenarios of one, and only one, network element being out of service.

13. The method for wind power curtailment optimization according to claim 9, wherein the contingency analysis is carried out in parallel for each of the contingency scenarios.

14. The method for wind power curtailment optimization according to claim 9, wherein the method is carried out on 24 hourly increments for the 24 hours of the day-ahead operational planning of the network.

* * * * *